United States Patent
Mino et al.

(10) Patent No.: US 12,428,554 B2
(45) Date of Patent: Sep. 30, 2025

(54) EPOXY RESIN COMPOSITION, CURED RESIN PRODUCT, PREPREG, AND FIBER-REINFORCED COMPOSITE MATERIAL

(71) Applicant: TORAY INDUSTRIES, INC., Tokyo (JP)

(72) Inventors: Takahiro Mino, Iyo-gun (JP); Akihiko Ito, Iyo-gun (JP); Hiroaki Sakata, Iyo-gun (JP)

(73) Assignee: TORAY INDUSTRIES, INC., Tokyo (JP)

( * ) Notice: Subject to any disclaimer, the term of this patent is extended or adjusted under 35 U.S.C. 154(b) by 629 days.

(21) Appl. No.: 17/788,043

(22) PCT Filed: Jan. 28, 2021

(86) PCT No.: PCT/JP2021/002942
§ 371 (c)(1),
(2) Date: Jun. 22, 2022

(87) PCT Pub. No.: WO2021/153644
PCT Pub. Date: Aug. 5, 2021

(65) Prior Publication Data
US 2023/0044019 A1    Feb. 9, 2023

(30) Foreign Application Priority Data
Jan. 29, 2020 (JP) ................... 2020-012292

(51) Int. Cl.
C08L 63/00    (2006.01)
C08J 5/24    (2006.01)

(52) U.S. Cl.
CPC ............... C08L 63/00 (2013.01); C08J 5/243 (2021.05); C08J 2363/00 (2013.01); C08J 2431/00 (2013.01); C08J 2481/06 (2013.01)

(58) Field of Classification Search
CPC ............... C08L 51/003; C08L 23/0815; C08L 23/0869; C08L 2201/02; C08L 2203/202; C08L 2205/025; C08L 205/035; C08L 2312/00; C08J 3/203; C08J 3/24; C08J 2323/08; C08J 2351/08; C08J 2423/08; C08J 2451/08; C09K 21/02; C09K 21/06; H01B 3/441; H01B 7/295; H01B 13/14; C08K 2003/2217; C08K 2003/2224; C08K 3/016; C08K 5/0066
See application file for complete search history.

(56) References Cited

U.S. PATENT DOCUMENTS 5,994,429 A * 11/1999 Honda .................... B32B 15/14
                                                            523/210
2008/0166511 A1    7/2008 Honma et al.
2013/0338266 A1   12/2013 Tomioka et al.

FOREIGN PATENT DOCUMENTS

| EP | 1731553 A1 * | 12/2006 | ............. B32B 27/08 |
| JP | 2010-265371 A | 11/2010 | |
| JP | 2011-148938 A | 8/2011 | |
| WO | WO 96/28511 A1 | 9/1996 | |
| WO | WO 2005/082982 A1 | 9/2005 | |
| WO | WO 2012/111743 A1 | 8/2012 | |

OTHER PUBLICATIONS

International Search Report, issued in PCT/JP2021/002942, PCT/ISA/210, dated Apr. 13, 2021.
Written Opinion of the International Searching Authority, issued in PCT/JP2021/002942, PCT/ISA/237, dated Apr. 13, 2021.

* cited by examiner

*Primary Examiner* — Robert S Jones, Jr.
*Assistant Examiner* — Elizabeth Amato
(74) *Attorney, Agent, or Firm* — Birch, Stewart, Kolasch & Birch, LLP

(57) ABSTRACT

An epoxy resin composition comprises the following components [A] to [E]: [A] epoxy resin, [B] amine-type curing agent, [C] cure accelerator, and [D] red phosphorus. The epoxy resin composition contains, per 100 mass parts for the total amount of [A], 25-45 mass parts of [A1] a liquid bisphenolic epoxy resin and 20-40 mass parts of [A2] a phenol novolac-type epoxy resin, and has a content ratio of [E] to [D] ([E]/[D]) of at least 1. Provided are a light-weight fiber-reinforced composite material that exhibits an excellent flame retardancy and mechanical properties and does not produce halogen gas during combustion, and an epoxy resin composition that has a viscosity suitable for obtaining the fiber-reinforced composite material as well as prepregs.

15 Claims, No Drawings

EPOXY RESIN COMPOSITION, CURED RESIN PRODUCT, PREPREG, AND FIBER-REINFORCED COMPOSITE MATERIAL

TECHNICAL FIELD

The present invention relates to an epoxy resin composition suitably used as a matrix resin of a fiber-reinforced composite material. More specifically, the present invention relates to an epoxy resin composition capable of providing a light-weight cured resin product having excellent flame retardancy and mechanical properties, a prepreg containing the epoxy resin composition, and a fiber-reinforced composite material including the cured resin product and a reinforcing fiber.

BACKGROUND ART

Fiber-reinforced composite materials employing a thermosetting resin such as an epoxy resin as a matrix resin, particularly carbon-fiber-reinforced composite materials employing a carbon fiber, are used in a wide range of fields such as structural materials and interior materials for airplanes and vehicles and reinforcement of concrete structures, in addition to sports fields such as golf clubs, tennis rackets, and fishing rods, because of light-weight properties and excellent mechanical properties. In recent years, carbon fibers have been used for housings of electronic and electric equipment such as notebook computers and video cameras because carbon fibers have not only excellent mechanical properties but also electrical conductivity, and carbon fibers are useful for thinning the housings and reducing the weight of the devices. Such a carbon-fiber-reinforced composite material is often obtained by laminating prepregs obtained by impregnating reinforcing fibers with a thermosetting resin.

Among various applications of carbon-fiber-reinforced composite materials, in particular, in structural materials and interior materials for aircraft, vehicles, and the like, it is strongly required that the materials have flame retardancy so that the materials will not be ignited and combusted due to a fire. In addition, in electronic and electrical equipment applications as well, flame retardancy of materials is required in order to prevent an accident in which a housing, a component, or the like is ignited and combusted due to heat generation from the inside of the device or exposure to a high temperature of the outside.

In such a flow, a compound containing a halogen represented by bromine in a molecule has been widely used to impart flame retardancy to a fiber-reinforced composite material. Specific examples thereof include a brominated epoxy resin and a flame-retardant epoxy resin composition employing antimony trioxide as a flame retardant added to the brominated epoxy resin.

However, since it has been pointed out that a resin composition containing a halogen as described above and a cured product thereof may generate hydrogen halide during combustion and adversely affect a human body and a natural environment, a non-halogen-based epoxy resin composition exhibiting excellent flame retardancy without containing a halogen is under development.

As a technique of imparting flame retardancy to an epoxy resin composition containing no halogen, a technique for a matrix resin for a carbon-fiber-reinforced composite material composed of an epoxy resin and red phosphorus is disclosed (for example, Patent Document 1). This technique does not generate halogen gas and uses a very high content of phosphorus, which has the effect of imparting a flame retardant, contained in red phosphorus, so that flame retardancy can be obtained without impairing the original characteristics of the epoxy resin in a small amount of addition. As technique of imparting flame retardancy to an epoxy resin composition containing no halogen, a technique for a matrix resin for a fiber-reinforced composite material composed of a phosphorus-containing epoxy resin, a novolac-type epoxy resin, and a metal oxide is disclosed (for example, Patent Document 2).

PRIOR ART DOCUMENTS

Patent Documents

Patent Document 1: WO 2005/082982
Patent Document 2: Japanese Patent No. 5904194

SUMMARY OF THE INVENTION

Problems to be Solved by the Invention

However, the epoxy resin composition and the carbon-fiber-reinforced composite material in which only red phosphorus is blended as a flame retardant, which are the technique of Patent Document 1, do not necessarily satisfy sufficient flame retardancy. In addition, although the technique of Patent Document 2 has an advantage of not generating a halogen gas, it is necessary to add a large amount of a metal oxide in order to obtain sufficient flame retardancy, and a resin composition containing a large amount of such a flame retardant has high viscosity, so that it may be difficult to impregnate a reinforcing fiber with the resin composition. In addition, when a large amount of an epoxy resin having a low viscosity is blended in order to lower the viscosity during impregnation, the resulting prepreg becomes sticky and the handling property deteriorates, and it has been difficult to adjust the balance.

An object of the present invention is to solve the problems in the prior art described above, to provide a light-weight fiber-reinforced composite material that has excellent flame retardancy and mechanical properties and does not emit a halogen gas during combustion, and to provide an epoxy resin composition having a viscosity suitable for obtaining such a fiber-reinforced composite material and a prepreg.

Solutions to the Problem

In order to achieve the above-mentioned object, the epoxy resin composition of the present invention has the following constitution.

That is, the epoxy resin composition is an epoxy resin composition containing components [A] to [E] below, the epoxy resin composition containing, per 100 parts by mass of the total amount of the component [A], 25 to 45 parts by mass of [A1] a liquid bisphenol type epoxy resin and 20 to 40 parts by mass of [A2] a phenol novolac-type epoxy resin and having a content ratio ([E]/[D]) of the component [E] to the component [D] of at least 1:

[A] an epoxy resin,
[B] an amine-type curing agent,
[C] a cure accelerator,
[D] red phosphorus, and
[E] aluminum hydroxide.

A cured resin product of the present invention is obtained by curing the epoxy resin composition.

A prepreg of the present invention is obtained by impregnating a reinforcing fiber with the epoxy resin composition.

A fiber-reinforced composite material of the present invention is obtained by curing the prepreg.

Effects of the Invention

The present invention can provide a light-weight fiber-reinforced composite material that has excellent flame retardancy and mechanical properties and does not emit a halogen gas during combustion and provide a prepreg and an epoxy resin composition having a viscosity suitable for providing such a fiber-reinforced composite material.

EMBODIMENT OF THE INVENTION

An epoxy resin composition, a cured resin product, a prepreg, and a fiber-reinforced composite material of the present invention will be described below.

The epoxy resin composition of the present invention contains [A] an epoxy resin, [B] an amine-type curing agent, [C] a cure accelerator, [D] red phosphorus, and [E] aluminum hydroxide.

The component [A] in the present invention contains [A1] a liquid bisphenol type epoxy resin and [A2] a phenol novolac-type epoxy resin. At this time, as the component [A], only [A1] and [A2] may be mixed, or other epoxy resins may be contained, and [A1] is preferably a bisphenol A type epoxy resin or a bisphenol F type epoxy resin although it is not particularly limited. In particular, it is preferable that a bisphenol A type epoxy resin and a bisphenol F type epoxy resin are contained as [A1], and the content ratio of the bisphenol F type epoxy resin to the bisphenol A type epoxy resin (mass ratio represented by bisphenol F type epoxy resin/bisphenol A type epoxy resin) is 1 or less. In the present invention, the term "liquid" refers to one that exhibits fluidity at 25° C.

In the epoxy resin composition of the present invention, the content of the epoxy resin [A1] is 25 to 45 parts by mass per 100 parts by mass of the total amount of [A], and the content of the epoxy resin [A2] is 20 to 40 parts by mass per 100 parts by mass of the total amount of the component [A]. Thus, when the epoxy resin composition is combined with a reinforcing fiber to form a prepreg, and the prepreg is heated and cured to form a fiber-reinforced composite material, high flame retardancy and heat resistance can be imparted.

In the present invention, when the contents of [A1] and [A2] are in the above ranges, both the tackiness of the epoxy resin composition and the flame retardancy required for the fiber-reinforced composite material can be achieved. From the viewpoint of the balance between flame retardancy and tackiness, the content ratio of [A2] to [A1] (mass ratio represented by [A2]/[A1]) is preferably in the range of 0.5 to 1.5.

Examples of commercially available products of the liquid bisphenol A type epoxy resin include "jER (registered trademark)" 825, "jER (registered trademark)" 826, "jER (registered trademark)" 827, "jER (registered trademark)" 828, "jER (registered trademark)" 834 (all manufactured by Mitsubishi Chemical Corporation), "EPICLON (registered trademark)" 850 (manufactured by DIC Corporation), "Epotohto (registered trademark)" YD-128 (manufactured by NIPPON STEEL Chemical & Material Co., Ltd.), DER-331, and DER-332 (both manufactured by The Dow Chemical Company).

Examples of commercially available products of the bisphenol F type epoxy resin include "jER (registered trademark)" 806, jER (registered trademark)" 807 (both manufactured by Mitsubishi Chemical Corporation), "EPICLON (registered trademark)" 830 (manufactured by DIC Corporation), and "Epotohto (registered trademark)" YDF-170 (manufactured by NIPPON STEEL Chemical & Material Co., Ltd.).

These resins may be used as [A1] singly or in combination with another epoxy resin. In particular, when a large amount of a flame retardant is added in order to impart high flame retardancy, it is preferable to combine a liquid bisphenol A type epoxy resin and a liquid bisphenol F type epoxy resin in order to maintain the tackiness of the resin composition.

Examples of commercially available products of the phenol novolac-type epoxy resin used for [A2] include "jER (registered trademark)" 152 and "jER (registered trademark)" 154 (both manufactured by Mitsubishi Chemical Corporation), "EPICLON (registered trademark)" N-740, "EPICLON (registered trademark)" N-770, and "EPICLON (registered trademark)" N-775 (all manufactured by DIC Corporation).

As each of the component [A1] and the component [A2], the products may be used singly or in combination of two or more thereof.

In the epoxy resin [A] in the present invention, an epoxy resin other than the epoxy resin [A1] or [A2] may be blended, and for example, a glycidyl ether type epoxy resin such as a solid bisphenol A type epoxy resin, a solid bisphenol S type epoxy resin, and an aliphatic epoxy resin, a glycidyl ester type epoxy resin, a glycidyl amine type epoxy resin, a rubber-modified epoxy resin, or the like may be blended.

The component [B] in the present invention is an amine-type curing agent. The amine-type curing agent refers to a compound having a nitrogen atom in the curing agent molecule.

The curing agent is not particularly specified as long as it contains a nitrogen atom in the molecule, and examples thereof include aromatic polyamine compounds having active hydrogen such as 4,4'-diaminodiphenylmethane, 4,4'-diaminodiphenyl sulfone, 3,3'-diaminodiphenyl sulfone, m-phenylenediamine, m-xylylenediamine, and diethyltoluenediamine; aliphatic amines having active hydrogen such as diethylenetriamine, triethylenetetramine, isophoronediamine, bis(aminomethyl)norbornane, bis(4-aminocyclohexyl)methane, and dimer acid esters of polyethyleneimine; modified amines obtained by reacting such an amine having active hydrogen with a compound such as an epoxy compound, acrylonitrile, phenol, formaldehyde, and thiourea; third amines having no active hydrogen such as N,N-dimethylaniline, N,N-dimethylbenzylamine, 2,4,6-tris(dimethylaminomethyl)phenol, and a mono-substituted imidazole; dicyandiamide; tetramethylguanidine; polycarboxylic acid hydrazides such as adipic acid hydrazide and naphthalene carboxylic acid hydrazide; and a Lewis acid complex such as a boron trifluoride ethylamine complex.

The amine-type curing agent [B] in the present invention preferably has a thermally active latency for its stability in the resin preparation step, storage stability at room temperature, or stability against heat history received in the step of impregnating a carbon fiber with the epoxy resin composition for a carbon-fiber-reinforced composite material. Here, the thermally active latency means a property that, although its activity is low as it is, the activity changes to a high state through a phase change, a chemical change, or the like by receiving a certain heat history.

The amine-type curing agent [B] of the present invention is preferably dicyandiamide. Dicyandiamide is a particulate curing agent that hardly dissolves in an epoxy resin at 25° C. but dissolves when heated to 100° C. or higher to react with an epoxy group. That is, it is a latent curing agent having characteristics of being insoluble at low temperatures and soluble at high temperatures.

The component [C] in the present invention is a cure accelerator and is used for enhancing the curing activity of the amine-type curing agent [B]. For example, urea derivatives and imidazole derivatives such as 3-phenyl-1,1-dimethylurea, 3-(3,4-dichlorophenyl)-1,1-dimethylurea (DCMU), 3-(3-chloro-4-methylphenyl)-1,1-dimethylurea, 4,4'-methylenebis(diphenyldimethylurea), and 2,4-toluenebis(3,3-dimethylurea) can be suitably used as a cure accelerator in combination with dicyandiamide. While dicyandiamide alone requires a temperature of about 170 to 180° C. for curing, a resin composition using such a combination can be cured at 80 to 150° C. In particular, a combination of dicyandiamide and a compound having two or more urea bonds in one molecule is preferable. As the compound having two or more urea bonds in one molecule, 4,4'-methylenebis(diphenyldimethylurea) or 2,4-toluenebis(3,3-dimethylurea) is preferable, and when these compounds are used, curing can be performed at 150 to 160° C. for about 2 to 30 minutes, which is preferable.

The component [D] in the present invention is red phosphorus. The flame retardant effect of red phosphorus is considered to be due to the promotion of the formation of carbides by phosphorus atoms and is greatly affected by the phosphorus content in the epoxy resin composition. In the present invention, in order to more effectively obtain flame retardancy, the content of the component [D] is preferably 2 to 10 parts by mass, more preferably 5 to 10 parts by mass, per 100 parts by mass of the total amount of the component [A], the epoxy resin.

Here, as red phosphorus, not only untreated red phosphorus but also one in which the surface of red phosphorus is coated with a metal hydrate and a resin to improve stability is used. Examples of the metal hydrate include aluminum hydroxide, magnesium hydroxide, zinc hydroxide, and titanium hydroxide. The type of the resin and the coating amount are not particularly limited, but the resin is preferably a phenol resin, an epoxy resin, polymethyl methacrylate, or the like having high affinity with the epoxy resin used in the present invention. In addition, the coating amount is preferably 1% by mass or more with respect to red phosphorus in order to suppress generation of phosphine gas at the time of kneading at a high temperature or the like. The coating amount is preferably as large as possible in terms of stability but is preferably not more than 20% by mass from the viewpoint of flame retardancy.

The component [E] in the present invention is aluminum hydroxide. It is considered that the flame retardant effect of aluminum hydroxide is due to heat absorption associated with decomposition during combustion to generate moisture.

The content ratio (mass ratio represented by [E]/[D], the same applies hereinafter) of the component [E] to the component [D] is 1 or more. As a result, the decomposition of the carbide at the initial stage of combustion can be suppressed by the endotherm at the time of thermal decomposition of the component [E], so that the formation of the carbide (char) by red phosphorus can be more effectively promoted. In addition, the content ratio ([E]/[D]) of the component [E] to the component [D] is preferably less than 25 from the viewpoint of the balance between the carbide formation by red phosphorus and the endothermic effect by aluminum hydroxide.

As the component [E], a particulate component can be usually used, and the particle diameter is not particularly limited. From the viewpoint of flame retardancy and dispersibility, the average diameter obtained from the arithmetic average is preferably 0.8 to 10.0 µm, more preferably 0.8 to 2.0 µm. The particle diameter can be measured by laser scattering particle size distribution measurement. Depending on the composition of the epoxy resin composition, the content of the component [E] is preferably 5 to 50 parts by mass, more preferably 10 to 50 parts by mass, still more preferably 15 to 45 parts by mass, per 100 parts by mass of the total amount of the component [A], which is the epoxy resin, from the viewpoint of the balance between the flame retardancy and the tackiness.

In the epoxy resin composition for a carbon-fiber-reinforced composite material of the present invention, one or a combination of two or more of other flame retardants may be used for improving flame retardancy.

Examples of other flame retardants include compounds containing nitrogen atoms, such as melamine cyanurate, melamine sulfate, and guanidine sulfamate; metal hydrates, such as magnesium hydroxide, calcium hydroxide, and tin hydroxide; metal oxides, such as zinc borate, zinc hydroxystannate, and magnesium oxide; silicone resins; and silicone oils.

In the epoxy resin composition for a carbon-fiber-reinforced composite material of the present invention, [F] a thermoplastic resin can be blended for viscoelasticity control and toughness imparting.

Examples of such a thermoplastic resin include poly (methyl methacrylate), polyvinyl acetals such as polyvinyl formal and polyvinyl butyral, polyvinylpyrrolidone, polymers containing at least two selected from aromatic vinyl monomers, vinyl cyanide monomers, and rubbery polymers as constituent components, polyamides, polyesters, polycarbonates, polyarylene oxides, polysulfones, polyethersulfones, polyimides, and phenoxy resins. Among them, polyvinyl formal and polyether sulfone are preferably used because they have good compatibility with many types of epoxy resins and the effect of controlling the fluidity of the epoxy resin composition for a carbon-fiber-reinforced composite material is large. Examples of commercially available products of polyvinyl formal include "VINYLEC (registered trademark)" K (manufactured by JNC Corporation), and examples of commercially available products of polyethersulfone include "SUMIKAEXCEL (registered trademark)" PES 5003P (manufactured by Sumitomo Chemical Co., Ltd.), "VIRANTAGE (registered trademark)" VW-10700RFP (manufactured by Solvay S.A.).

In the epoxy resin composition for a carbon-fiber-reinforced composite material of the present invention, the preferred blending amount of the thermoplastic resin component depends on the type of the thermoplastic resin, but in the case of polyvinyl formal, 0.5 to 10 parts by mass is preferably contained per 100 parts by mass of the epoxy resin, and in the case of polyethersulfone, 5 to 30 parts by mass is preferably contained. Within these ranges, both the drapability of the prepreg and the flame retardancy of the carbon-fiber-reinforced composite material can be achieved.

When the epoxy resin composition for a carbon-fiber-reinforced composite material used in the present invention is used in prepreg applications, the viscosity at 40° C. is preferably 1,500 to 30,000 Pa·s, and the viscosity at 60° C. is preferably 10 to 700 Pa·s, from the viewpoint of processability such as tackiness and drapability. When the viscosity at 40° C. is 1,500 to 30,000 Pa·s, the shape retention of the prepreg is high, and when the viscosity at 60° C. is 10 to 700 Pa·s, high impregnating property into the reinforcing fiber at the time of molding is obtained, which is preferable because the fiber content is stable. The viscosity at 60° C. is more preferably 65 to 85 Pa·s. When the viscosity at 40° C. exceeds 30,000 Pa·s, there is a case where blurring occurs in a filming step of the epoxy resin composition for a carbon-fiber-reinforced composite material, or an unimpregnated portion is formed in a step of impregnating the carbon fiber.

The viscosities at 40° C. and 60° C. herein are determined by the following method. That is, using a dynamic viscoelasticity measuring apparatus such as ARES manufactured by TA Instruments Japan Inc., the epoxy resin composition is set so that the distance between the upper and lower plates will be 1 mm using flat parallel plates having a diameter of 40 mm. After confirming that the temperature has reached 40° C., measurement is performed in a torsional mode (angular frequency: 3.14 rad/s) at a simple temperature rise of 5° C./min, and the complex viscosity $\eta^*$ at 40° C. and 60° C. is determined.

The larger the amount of carbides (char) remaining after thermally decomposing the cured product obtained by curing the epoxy resin composition used in the present invention is, the higher the flame retardancy is, which is preferable. Specifically, it is preferable that the char generation ratio at the time of reaching 600° C. when heating is performed at a simple temperature rise of 10° C./min from room temperature under an air flow of 200 ml/min is 30% or more, and the char generation ratio at the time of reaching 900° C. when heating is performed at a simple temperature rise of 60° C./min from room temperature under a nitrogen flow of 200 ml/min is 25% or more. The char generation ratio mentioned here is a value represented by (mass of pyrolysis residue at the time of reaching a predetermined temperature (g))/(mass of cured epoxy resin product before measurement (g))×100 using a thermogravimetric analyzer TG-DTA.

The glass transition temperature of the cured product is preferably 90 to 250° C., more preferably 90 to 220° C., still more preferably 95 to 200° C. When the glass transition temperature is lower than 90° C., the heat resistance of the cured product is insufficient, so that the carbon-fiber-reinforced composite material may be distorted, and deformation may occur when used in a high-temperature environment. When the glass transition temperature exceeds 250° C., the cured product tends to be brittle, and the tensile strength and impact resistance of the carbon-fiber-reinforced composite material may be lowered. The glass transition temperature here is a midpoint temperature determined on the basis of JIS K 7121 (1987) using a differential scanning calorimeter (DSC).

In the prepreg of the present invention, it is preferable to use a carbon fiber as the reinforcing fiber. By using a carbon fiber as the reinforcing fiber, excellent flame retardancy, strength, and impact resistance can be exhibited in the fiber-reinforced composite material.

The epoxy resin composition of the present invention in combination with a reinforcing fiber can be used as a fiber-reinforced composite material. A carbon fiber can be preferably used as the reinforcing fiber, and the carbon fiber used may be any known carbon fiber. A carbon fiber having a strand tensile strength in a strand tensile test of 3,000 MPa or more and 7,500 MPa or less and an elastic modulus of 200 GPa or more and 450 GPa or less is preferably used. The strand tensile test refers to a test performed based on JIS R 7601 (1986).

The number of filaments of the carbon fiber is preferably 2,500 to 50,000, more preferably 2,800 to 40,000, from the viewpoint that the fiber arrangement does not meander and that resin impregnation is easy at the time of producing or molding the prepreg.

Carbon fibers used in the present invention are classified into polyacrylonitrile-based carbon fibers, rayon-based carbon fibers, pitch-based carbon fibers, and the like. Of these, polyacrylonitrile-based carbon fibers, which have high tensile strength, are preferably used. A polyacrylonitrile-based carbon fiber can be produced through, for example, a process as described below. A spinning solution that contains polyacrylonitrile produced from monomers mainly formed of acrylonitrile is spun by wet spinning, dry-wet spinning, dry spinning, or melt spinning. To produce a carbon fiber, the coagulated thread after spinning is subjected to a yarn-making step to provide a precursor, which is then subjected to subsequent steps such as flameproofing and carbonization.

Examples of commercially available products of the carbon fiber include "TORAYCA (registered trademark)" T700G-24K, TORAYCA (registered trademark)" T300-3K, and "TORAYCA (registered trademark)" T700S-12K having a tensile elastic modulus of 230 GPa, "TORAYCA (registered trademark)" T800G-24K and "TORAYCA (registered trademark)" T800S-24K having a tensile elastic modulus of 294 GPa, and "TORAYCA (registered trademark)" T1100G-24K having a tensile elastic modulus of 324 GPa (all manufactured by Toray Industries, Inc.).

The form and filament-arrangement of the carbon fiber is appropriately selectable from those of long filaments arranged in one direction and woven fabrics, and others. In order to give a light-weight carbon-fiber-reinforced composite material having a higher-level endurance, preferred is the form of a continuous fiber, such as long filaments (fiber bundle) arranged in one direction or woven fabric. The long filament herein refers to a fiber strand having an average length of 10 mm or more.

The carbon fiber bundle used in the present invention preferably has a single fiber fineness of 0.2 to 2.0 dtex, more preferably 0.4 to 1.8 dtex, from the viewpoint of not damaging the carbon fiber bundle during twisting or in the impregnation treatment step of the resin composition and sufficiently impregnating the carbon fiber bundle with the resin composition.

The prepreg of the present invention can be produced by various known methods. For example, the prepreg can be produced by a wet process in which a matrix resin made of the epoxy resin composition of the present invention is dissolved in an organic solvent selected from acetone, methyl ethyl ketone, methanol, and the like to reduce its viscosity and impregnated into a reinforcing fiber, or a hot-melt process in which a matrix resin is heated to reduce its viscosity without using an organic solvent and impregnated into a reinforcing fiber.

In the wet process, it is possible to immerse the reinforcing fiber in a liquid containing a matrix resin, then pull it up, and evaporate the organic solvent using an oven or the like to obtain a prepreg. Further, in the hot-melt process, a method of directly impregnating a reinforcing fiber with a matrix resin heated to reduce its viscosity, a method of impregnating a reinforcing fiber with a matrix resin by first preparing a release paper sheet with a resin film once coated with a matrix resin on a release paper or the like (hereinafter also referred to as "resin film"), then laminating a resin film on the reinforcing fiber side from both sides or one side of the reinforcing fiber, followed by heating and pressurizing, or the like can be used.

As a method for producing the prepreg of the present invention, a hot-melt process of impregnating a reinforcing fiber with a matrix resin without using an organic solvent is suitably used because the prepreg is substantially free of organic solvent residue.

The prepreg of the present invention preferably has an amount of the reinforcing fiber per unit area of 70 to 2,000 g/m². When the amount of the reinforcing fiber is in the range of 70 to 2,000 g/m², the drapability of the prepreg is excellent, and when a fiber-reinforced composite material is molded, the number of laminated prepregs for obtaining a predetermined thickness is moderate, so that workability is excellent.

The mass content of the reinforcing fiber in the prepreg of the present invention is preferably 30 to 90% by mass, more preferably 35 to 85% by mass, still more preferably 40 to 80% by mass. When the mass content of the reinforcing fibers in the prepreg is 30% by mass or more, a fiber-reinforced composite material excellent in specific strength and specific elastic modulus can be obtained, or the calorific value for curing when the fiber-reinforced composite material is molded can be suppressed. When the mass content of the reinforcing fiber in the prepreg is 90% by mass or less, the reinforcing fiber is sufficiently impregnated with the matrix resin, and a fiber-reinforced composite material without voids can be obtained.

The fiber-reinforced composite material of the present invention can be produced by a method in which the above-described prepreg of the present invention is laminated in a predetermined form and heated and pressurized to cure the matrix resin as an example. Herein, examples of a method of applying heat and pressure include a press molding method, an autoclave molding method, a bagging molding method, a wrapping tape method, and an internal pressure molding method.

Furthermore, the fiber-reinforced composite material can be produced by a method in which a reinforcing fiber is directly impregnated with the epoxy resin composition of the present invention without using a prepreg and then heated and cured, for example, a molding method such as a hand lay-up method, a filament winding method, a pultrusion method, a resin injection molding method, and a resin transfer molding method.

A laminate of a carbon-fiber-reinforced composite material obtained by laminating and curing the prepreg of the present invention has high flame retardancy of a peak heat release rate of less than 70 kW·m⁻², preferably less than 50 kW·m⁻², as measured with a thickness of 1 mm in a heat release test (OSU method) in accordance with FAR 25.853 (Appendix F, Part IV).

EXAMPLES

The present invention will be illustrated below with reference to examples, but it should be understood that the present invention is not construed as being limited thereto. The materials used in examples and comparative examples are shown below.

Component [A1]: Liquid Bisphenol Type Epoxy Resin

"jER (registered trademark)" 828 (liquid bisphenol A type epoxy resin, manufactured by Mitsubishi Chemical Corporation)

"EPICLON (registered trademark)" 830 (bisphenol F type epoxy resin, manufactured by DIC Corporation)

Component [A2]: Phenol Novolac-Type Epoxy Resin

"jER (registered trademark)" 154 (phenol novolac-type epoxy resin, manufactured by Mitsubishi Chemical Corporation)

Component [A] Other Than Component [A1] and Component [A2]: Epoxy Resin

"jER (registered trademark)" 1001 (solid bisphenol A type epoxy resin, manufactured by Mitsubishi Chemical Corporation)

Component [B]: Amine-Type Curing Agent

Dicy7T (dicyandiamide, manufactured by Mitsubishi Chemical Corporation)

Component [C]: Cure Accelerator

"OMICURE (registered trademark)" 24 (2,4'-toluene bis (3,3-dimethylurea), manufactured by PTI Japan Ltd.).

Component [D]: Red Phosphorus

"NOVARED (registered trademark)" 120UF (surface-coated red phosphorus, phosphorus content: 75% by mass, manufactured by RIN KAGAKU KOGYO Co., Ltd.)

Component [E]: Aluminum Hydroxide

C-301 N (aluminum hydroxide, average particle diameter: 1.5 μm, manufactured by Sumitomo Chemical Co., Ltd.)

Component [F]: Thermoplastic Resin

"VINYLEC (registered trademark)" K (polyvinyl formal, manufactured by JNC CORPORATION)
"VIRANTAGE (registered trademark)" VW-10700RFP (polyether sulfone, manufactured by Solvay S.A.).

Carbon Fiber

"TORAYCA (registered trademark)" T700SC-12K (tensile strength: 4.9 GPa, tensile elastic modulus: 230 GPa, elongation: 2.1%, specific gravity of fiber: 1.80, manufactured by Toray Industries, Inc.)

(1) Method for Preparing Epoxy Resin Composition

An epoxy resin corresponding to the component [A] as shown in Tables 1 and 2, red phosphorus corresponding to the component [D], aluminum hydroxide corresponding to the component [E], and a thermoplastic resin corresponding to the component [F] were put in a kneading machine and then heated and kneaded to dissolve the component [F]. Then, the mixture was cooled to a temperature of 60° C. or lower, Dicy7T corresponding to the component [B] and a cure accelerator corresponding to the component [C] shown in Tables 1 and 2 were added, and the mixture was stirred so as to be uniformly dispersed to provide an epoxy resin composition for a carbon-fiber-reinforced composite material.

(2) Viscosity Measurement of Epoxy Resin Composition

The viscosity of the epoxy resin composition was measured using a dynamic viscoelastometer ARES-G2 (manufactured by TA Instruments). That is, the epoxy resin composition was set so that the distance between the upper and lower plates would be 1 mm using flat parallel plates having a diameter of 40 mm. After confirming that the temperature had reached 40° C., measurement was performed in a torsional mode (angular frequency: 3.14 rad/s) at a simple temperature rise of 5° C./min to 60° C., and the viscosity at 40° C. and 60° C. was determined.

Based on this measurement, evaluation criteria of tackiness and drapability were set as follows.

Evaluation Criteria (Tackiness and Drapability)

A: "The viscosity at 40° C. is 1,500 to 30,000 Pa·s, and the viscosity at 60° C. is 10 to 700 Pa·s".
B: "The viscosity at 40° C. is less than 1,500 Pa·s, and the viscosity at 60° C. is 10 to 700 Pa·s", "the viscosity at 40° C. is 1,500 to 30,000 Pa·s, and the viscosity at 60° C. is less than 10 Pa·s", or "the viscosity at 40° C. is 1,500 to 30,000 Pa·s, and the viscosity at 60° C. is more than 700 Pa·s".
C: "The viscosity at 40° C. is less than 1,500 Pa·s, and the viscosity at 60° C. is less than 10 Pa·s", "the viscosity at 40° C. is more than 30,000 Pa·s", or "the viscosity at 40° C. is less than 1,500 Pa·s, and the viscosity at 60° C. is more than 700 Pa·s".

(3) Evaluation of Flame Retardancy of Cured Epoxy Resin Product

The epoxy resin composition prepared in item (1) was defoamed in a vacuum and then cured under predetermined curing conditions in a mold set to a thickness of 2 mm with a 2-mm thick "TEFLON (registered trademark)" spacer to give a cured epoxy resin product having a thickness of 2 mm. Evaluation of flame retardancy was performed with a thermogravimetric analysis apparatus (TG-DTA) (AXS WS003 System from Bruker AXS GmbH). About 10 mg of a test piece was cut out from the cured epoxy resin product, and the char generation ratio (%) at the time of reaching 600° C. when the temperature was simply raised at a temperature raising rate of 10° C./min from room temperature under an air flow of 200 ml/min, and the char generation ratio (%) at the time of reaching 900° C. when the temperature was simply raised at a temperature raising rate of 60° C./min from room temperature under a nitrogen flow of 200 ml/min were used as indices of flame retardancy. The char generation ratio mentioned here is a value represented by (mass of pyrolysis residue at the time of reaching predetermined temperature (g))/(mass of cured epoxy resin product before measurement (g))×100.

Based on this measurement, evaluation criteria of flame retardancy were set as follows.

Evaluation Criteria (Flame Retardancy)

S: "The char generation ratio under an air flow is 30% or more, and the char generation ratio under a nitrogen flow is 35% or more".
A: "The char generation ratio under an air flow is 30% or more, and the char generation ratio under a nitrogen flow is 25% or more and less than 35%".
B: "The char generation ratio under an air flow is 30% or more, and the char generation ratio under a nitrogen flow is less than 25%" or "the char generation ratio under an air flow is less than 30%, and the char generation ratio under a nitrogen flow is 25% or more".
C: "The char generation ratio under an air flow is less than 30%, and the char generation ratio under a nitrogen flow is less than 25%".

(4) Production of Prepreg

A predetermined amount of the epoxy resin composition prepared in item (1) was applied to release paper to produce a resin film. This resin film was set in a prepreg producing machine, the resin film was superposed on a carbon fiber in which filaments were aligned in one direction in a sheet shape so that the fiber mass per unit area would be 150 g/m$^2$ from both sides of the carbon fiber, and the product was heated and pressurized to impregnate the carbon fiber with the resin composition, thereby producing a unidirectional prepreg having a carbon fiber areal weight of 150 g/m$^2$ and a matrix resin mass fraction of 33%. As the carbon fiber, "TORAYCA (registered trademark)" T700SC-12K was used.

(5) Production of Laminate of Carbon-Fiber-Reinforced Composite Material

Seven plies of the unidirectional prepreg produced in item (4) were laminated in a configuration of (0/90/0/90/0/90/0) to produce a laminate having a thickness of 1 mm. In an autoclave, molding was performed at a temperature of 130° C. for 90 minutes under a pressure of 0.6 MPa at a temperature raising rate of 2.5° C./min to produce a laminate of a unidirectional material having a thickness of 1 mm. A piece was cut out from the laminate so as to have a width of 150 mm and a length of 150 mm.

(6) Heat Release Test (OSU Method)

The laminate produced in item (5) was subjected to a heat release test (OSU method) in accordance with FAR 25.853 (Appendix F, Part IV) to evaluate the peak heat release rate.

Based on this measurement, evaluation criteria of flame retardancy were set as follows.

Evaluation Criteria (Flame Retardancy)

S: The peak heat release rate is less than 50 kW·m$^{-2}$.
A: The peak heat release rate is 50 kW·m$^{-2}$ or more and less than 70 kW·m$^{-2}$.
B: The peak heat release rate is 70 kW·m$^{-2}$ or more.

Example 1

As shown in Table 1, an epoxy resin composition was prepared using "jER (registered trademark)" 828 as the component [A1], "jER (registered trademark)" 154 as the component [A2], "jER (registered trademark)" 1001 as the component [A] other than the component [A1] and the component [A2], Dicy7T as the component [B], "OMICURE (registered trademark)" 24 as the component [C], "NOVARED (registered trademark)" 120UF as the component [D], C-301N as the component [E], and "VINYLEC (registered trademark)" K as the component [F], and viscosity measurement and thermal weight measurement of the cured resin product were performed. Using "TORAYCA (registered trademark)" T700SC-12K as a carbon fiber, a laminate of a carbon-fiber-reinforced composite material was produced, and a heat release test (OSU method) was also performed. The viscosity of the resin composition was sufficient (A) to provide a fiber-reinforced composite material and a prepreg, and the flame retardancy of the cured resin product and the laminate of the carbon-fiber-reinforced composite material was also good (A).

Example 2

A cured resin product and a laminate of a carbon-fiber-reinforced composite material were produced in the same manner as in Example 1 except that the amount of "jER (registered trademark)" 1001 blended as the component [A] was reduced, "EPICLON (registered trademark)" 830 was added instead, and the amount of the component [E] C-301N blended was increased from 10 parts by mass to 50 parts by mass. As a result of evaluating the characteristics, the flame retardancy was higher (S) than that in Example 1.

Example 3

A cured resin product and a laminate of a carbon-fiber-reinforced composite material were produced in the same manner as in Example 2 except that the amount of "jER (registered trademark)" 1001 blended as the component [A] was slightly increased, and the amount of "EPICLON (registered trademark)" 830 blended was slightly decreased. Evaluation showed that the characteristics were as good as in Example 2.

Example 4

A cured resin product and a laminate of a carbon-fiber-reinforced composite material were produced in the same manner as in Example 3 except that the amount of "jER (registered trademark)" 1001 blended as the component [A] was slightly increased, and the amount of "jER (registered trademark)" 154 blended was slightly decreased. Evaluation showed that the characteristics were as good as in Example 3.

Example 5

A cured resin product and a laminate of a carbon-fiber-reinforced composite material were produced in the same manner as in Example 3 except that the amount of "jER (registered trademark)" 1001 blended as the component [A] was slightly increased, and the amount of "jER (registered trademark)" 154 blended was slightly decreased. Evaluation showed that the characteristics were as good as in Example 3.

Example 6

A cured resin product and a laminate of a carbon-fiber-reinforced composite material were produced in the same manner as in Example 3 except that the amount of "jER (registered trademark)" 1001 blended as the component [A] was slightly decreased, and the amount of "jER (registered trademark)" 154 blended was slightly increased. Evaluation showed that the characteristics were as good as in Example 3.

Example 7

A cured resin product and a laminate of a carbon-fiber-reinforced composite material were produced in the same manner as in Example 5 except that 10 parts by mass of "VIRANTAGE (registered trademark)" VW-10700RFP was used as the component [F]. Evaluation showed that the characteristics were as good as in Example 5.

Example 8

A cured resin product and a laminate of a carbon-fiber-reinforced composite material were produced in the same manner as in Example 2 except that the amount of "jER (registered trademark)" 1001 blended as the component [A] was slightly increased, the amount of "EPICLON (registered trademark)" 830 blended was slightly decreased, and the amount of C-301N blended as the component [E] was slightly decreased. Evaluation showed that the characteristics were as good as in Example 2.

Example 9

A cured resin product and a laminate of a carbon-fiber-reinforced composite material were produced in the same manner as in Example 5 except that the amount of "NOVARED (registered trademark)" 120UF blended as the component [D] was slightly decreased, and the amount of C-301N blended as the component [E] was slightly increased. Evaluation showed that the characteristics were as good as in Example 5.

Example 10

A cured resin product and a laminate of a carbon-fiber-reinforced composite material were produced in the same manner as in Example 5 except that the amount of "NOVARED (registered trademark)" 120UF blended as the component [D] was slightly decreased, and the amount of C-301N blended as the component [E] was slightly increased. Evaluation showed that the characteristics were as good as in Example 5.

Comparative Example 1

A resin composition and a cured resin product were produced in the same manner as in Example 1 except that the component [E] was not contained. As a result of evaluating the characteristics, the viscosity of the resin composition was good (A), but the flame retardancy of the cured resin product was insufficient (B).

Comparative Example 2

A resin composition and a cured resin product were produced in the same manner as in Example 1 except that the component [D] was not contained. As a result of evaluating the characteristics, the viscosity of the resin composition was good, but the flame retardancy of the cured resin product was significantly lower (C) than in Example 1.

Comparative Example 3

A resin composition and a cured resin product were produced in the same manner as in Example 1 except that the amount of the component [D] blended was reduced from 10 parts by mass to 5 parts by mass, and the component [E] was not contained. As a result of evaluating the characteristics, the viscosity of the resin composition was slightly insufficient (B), and the flame retardancy of the cured resin product was also insufficient (B).

Comparative Example 4

A resin composition and a cured resin product were produced in the same manner as in Example 1 except that the amount of the component [E] blended was reduced from 10 parts by mass to 5 parts by mass. As a result of evaluating the characteristics, the viscosity of the resin composition was sufficient (A), but the flame retardancy of the cured resin product was slightly insufficient (B).

Comparative Example 5

A resin composition and a cured resin product were produced in the same manner as in Example 1 except that only "jER (registered trademark)" 154 was contained as the component [A]. As a result of evaluating the characteristics, the flame retardancy of the cured resin product was sufficient (A), but the viscosity of the resin composition was slightly insufficient (B).

Comparative Example 6

A resin composition and a cured resin product were produced in the same manner as in Example 1 except that only "jER (registered trademark)" 828 was contained as the component [A], and the amount of the component [B] blended was slightly increased. As a result of evaluating the characteristics, the flame retardancy of the cured resin product was sufficient (A), but the viscosity of the resin composition was significantly lower than in Example 1 and was insufficient (C).

Comparative Example 7

A resin composition and a cured resin product were produced in the same manner as in Example 1 except that only 50 parts by mass each of "jER (registered trademark)" 828 and "jER (registered trademark)" 154 were contained as the component [A], and the amount of the component [B] blended was slightly increased. As a result of evaluating the characteristics, the flame retardancy of the cured resin product was sufficient (A), but the viscosity of the resin composition was significantly lower than in Example 1 and was insufficient (B).

Comparative Example 8

A resin composition and a cured resin product were produced in the same manner as in Example 1 except that the amount of the component [A1] blended was changed from 30 parts by mass to 20 parts by mass, the amount of the component [A2] blended was changed from 35 parts by mass to 10 parts by mass, the amount of "jER (registered trademark)" 1001 blended was changed from 35 parts by mass to 70 parts by mass, and the amount of the component "B" blended was slightly reduced. As a result of evaluating the characteristics, the flame retardancy of the cured resin product was sufficient (A), but the viscosity of the resin composition was significantly higher than in Example 1 and was insufficient (C).

Comparative Example 9

A cured resin product and a laminate of a carbon-fiber-reinforced composite material were produced in the same manner as in Example 3 except that the amount of "jER (registered trademark)" 1001 blended as the component [A] was greatly decreased, and the amount of "jER (registered trademark)" 154 blended was greatly increased. As a result of evaluating the characteristics, the flame retardancy of the cured resin product was sufficient (S), but the viscosity of the resin composition was significantly lower than in Example 3 and was slightly insufficient (B).

Comparative Example 10

A cured resin product and a laminate of a carbon-fiber-reinforced composite material were produced in the same manner as in Example 3 except that the amount of "jER (registered trademark)" 1001 blended as the component [A] was greatly decreased, the amount of "jER (registered trademark)" 154 blended was slightly decreased, and the amount of "jER (registered trademark)" 828 blended was greatly increased. As a result of evaluating the characteristics, the flame retardancy of the cured resin product was sufficient (A), but the viscosity of the resin composition was significantly lower than in Example 3 and was insufficient (B).

TABLE 1-1

|  |  |  | Example 1 | Example 2 | Example 3 | Example 4 | Example 5 |
|---|---|---|---|---|---|---|---|
| Epoxy resin | Component [A1]: "jER (registered trademark)" 828 | Part by mass | 30 | 30 | 30 | 30 | 30 |
|  | Component [A1]: EPICLON (registered trademark)" 830 | Part by mass |  | 15 | 10 | 10 | 10 |
|  | Component [A2]: "jER (registered trademark)" 154 | Part by mass | 35 | 35 | 35 | 20 | 25 |
|  | Component [A] other than component [A1] and component [A2]: "jER (registered trademark)" 1001 | Part by mass | 35 | 20 | 25 | 40 | 35 |
| Amine-type curing agent | Component [B]: Dicy7T | Part by mass | 3.5 | 3.5 | 3.5 | 3.5 | 3.5 |
| Cure accelerator | Component [C]: "OMICURE (registered trademark)" 24 | Part by mass | 2 | 2 | 2 | 2 | 2 |
| Red phosphorus | Component [D]: "NOVARED (registered trademark)" 120UF | Part by mass | 10 | 5 | 5 | 5 | 5 |
| Aluminum hydroxide | Component [E]: C-301N | Part by mass | 10 | 50 | 50 | 50 | 50 |

TABLE 1-1-continued

|  |  |  | Example 1 | Example 2 | Example 3 | Example 4 | Example 5 |
|---|---|---|---|---|---|---|---|
| Thermoplastic resin | | Component [F]: "VINYLEC (registered trademark)" K | Part by mass | 3 | 3 | 3 | 3 | 3 |
| | | Component [F]: "VIRANTAGE (registered trademark)" VW-10700RFP | Part by mass | | | | | |
| | | [E]/[D] | | 1 | 10 | 10 | 10 | 10 |
| Epoxy resin composition | Tackiness and drapability | Viscosity at 40° C. (Pa·s) | | 2176 | 1510 | 1550 | 4187 | 40964 |
| | | Viscosity at 60° C. (Pa·s) | | 75 | 76 | 80 | 176 | 1584 |
| | | Evaluation | | A | A | A | A | A |
| Cured epoxy resin product | Flame retardancy | Char generation ratio measured with TG-DTA (%) (under air flow at 600° C.) | | 39 | 34 | 34 | 41 | 43 |
| | | Char generation ratio measured with TG-DTA (%) (under nitrogen flow at 900° C.) | | 27 | 35 | 35 | 33 | 35 |
| | | Evaluation | | A | S | S | A | S |
| Laminate of carbon-fiber-reinforced composite material | Flame retardancy | Peak heat release rate in heat release test (kW/m$^2$) | | 56 | 47 | 45 | — | — |
| | | Evaluation | | A | S | S | — | — |

TABLE 1-2

|  |  |  |  | Example 6 | Example 7 | Example 8 | Example 9 | Example 10 |
|---|---|---|---|---|---|---|---|---|
| Epoxy resin | | Component [A1]: "jER (registered trademark)" 828 | Part by mass | 30 | 30 | 30 | 30 | 30 |
| | | Component [A1]: EPICLON (registered trademark)" 830 | Part by mass | 10 | 10 | 5 | 10 | 10 |
| | | Component [A2]: "jER (registered trademark)" 154 | Part by mass | 40 | 25 | 35 | 25 | 25 |
| | | Component [A] other than component [A1] and component [A2]: "jER (registered trademark)" 1001 | Part by mass | 20 | 35 | 30 | 35 | 35 |
| Amine-type curing agent | | Component [B]: Dicy7T | Part by mass | 3.5 | 3.5 | 3.5 | 3.5 | 3.5 |
| Cure accelerator | | Component [C]: "OMICURE (registered trademark)" 24 | Part by mass | 2 | 2 | 2 | 2 | 2 |
| Red phosphorus | | Component [D]: "NOVARED (registered trademark)" 120UF | Part by mass | 5 | 5 | 5 | 3 | 2 |
| Aluminum hydroxide | | Component [E]: C-301N | Part by mass | 50 | 50 | 40 | 60 | 60 |
| Thermoplastic resin | | Component [F]: "VINYLEC (registered trademark)" K | Part by mass | 3 | | 3 | 3 | 3 |
| | | Component [F]: "VIRANTAGE (registered trademark)" VW-10700RFP | Part by mass | | 10 | | | |
| | | [E]/[D] | | 10 | 10 | 8 | 20 | 30 |
| Epoxy resin composition | Tackiness and drapability | Viscosity at 40° C. (Pa·s) | | 1503 | 22782 | 2630 | 2330 | 2238 |
| | | Viscosity at 60° C. (Pa·s) | | 74 | 513 | 113 | 103 | 98 |
| | | Evaluation | | A | A | A | A | A |
| Cured epoxy resin product | Flame retardancy | Char generation ratio measured with TG-DTA (%) (under air flow at 600° C.) | | 47 | 47 | 41 | 33 | 31 |
| | | Char generation ratio measured with TG-DTA (%) (under nitrogen flow at 900° C.) | | 36 | 34 | 34 | 35 | 36 |
| | | Evaluation | | S | A | A | S | S |
| Laminate of carbon-fiber-reinforced composite material | Flame retardancy | Peak heat release rate in heat release test (kW/m$^2$) | | — | — | — | — | — |
| | | Evaluation | | — | — | — | — | — |

TABLE 2-1

|  |  |  | Comparative Example 1 | Comparative Example 2 | Comparative Example 3 | Comparative Example 4 | Comparative Example 5 |
|---|---|---|---|---|---|---|---|
| Epoxy resin | Component [A1]: "jER (registered trademark)" 828 | Part by mass | 30 | 30 | 30 | 30 | |
| | Component [A1]: "EPICLON (registered trademark)" 830 | Part by mass | | | | | |
| | Component [A2]: "jER (registered trademark)" 154 | Part by mass | 35 | 35 | 35 | 35 | 100 |
| | Component [A] other than component [A1] and component [A2]: "jER (registered trademark)" 1001 | Part by mass | 35 | 35 | 35 | 35 | |
| Amine-type curing agent | Component [B]: Dicy7T | Part by mass | 3.5 | 3.5 | 3.5 | 3.5 | 3.5 |
| Cure accelerator | Component [C]: "OMTCURE (registered trademark)" 24 | Part by mass | 2 | 2 | 2 | 2 | 2 |
| Red phosphorus | Component [D]: "NOVARED (registered trademark)" 120UF | Part by mass | 10 | | 5 | 10 | 10 |
| Aluminum hydroxide | Component [E]: C-301N | Part by mass | | 10 | | 5 | 10 |
| Thermoplastic resin | Component [F]: "VINYLEC (registered trademark)" K | Part by mass | 3 | 3 | 3 | 3 | 3 |
| | Component [F]: "VIRANTAGE (registered trademark)" VW-10700RFP | Part by mass | | | | | |
| | [E]/[D] | | 0 | — | 0 | 0.5 | 1 |
| Epoxy resin composition | Tackiness and drapability | Viscosity at 40° C. (Pa · s) | 1566 | 4839 | 760 | 2280 | 1134 |
| | | Viscosity at 60° C. (Pa · s) | 49 | 122 | 34 | 95 | 45 |
| | | Evaluation | A | A | B | A | B |
| Cured epoxy resin product | Flame retardancy | Char generation ratio measured with TGDTA (%) (under air flow at 600° C.) | 39 | 11 | 34 | 39 | 39 |
| | | Char generation ratio measured with TGDTA (%) (under nitrogen flow at 900° C.) | 22 | 7 | 22 | 22 | 28 |
| | | Evaluation | B | C | B | B | A |
| Laminate of carbon-fiber-reinforced composite material | Flame retardancy | Peak heat release rate in heat release test (kW/m$^2$) | — | — | 70 | — | — |
| | | Evaluation | — | — | B | — | — |

TABLE 2-2

|  |  |  | Comparative Example 6 | Comparative Example 7 | Comparative Example 8 | Comparative Example 9 | Comparative Example 10 |
|---|---|---|---|---|---|---|---|
| Epoxy resin | Component [A1]: "jER (registered trademark)" 828 | Part by mass | 100 | 50 | 20 | 30 | 50 |
| | Component [A1]: "EPICLON (registered trademark)" 830 | Part by mass | | | | 10 | 10 |
| | Component [A2]: "jER (registered trademark)" 154 | Part by mass | | 50 | 10 | 50 | 30 |
| | Component [A] other than component [A1] and component [A2]: "jER (registered trademark)" 1001 | Part by mass | | | 70 | 10 | 10 |
| Amine-type curing agent | Component [B]: Dicy7T | Part by mass | 4.3 | 4.5 | 2.5 | 3.5 | 3.5 |
| Cure accelerator | Component [C]: "OMTCURE (registered trademark)" 24 | Part by mass | 2 | 2 | 2 | 2 | 2 |
| Red phosphorus | Component [D]: "NOVARED (registered trademark)" 120UF | Part by mass | 10 | 10 | 10 | 5 | 5 |
| Aluminum hydroxide | Component [E]: C-301N | Part by mass | 10 | 10 | 10 | 50 | 50 |
| Thermoplastic resin | Component [F]: "VINYLEC (registered trademark)" K | Part by mass | 3 | 3 | 3 | 3 | 3 |
| | Component [F]: "VIRANTAGE (registered trademark)" VW-10700RFP | Part by mass | | | | | |
| | [E]/[D] | | 1 | 1 | 1 | 10 | 10 |

TABLE 2-2-continued

|  |  |  | Comparative Example 6 | Comparative Example 7 | Comparative Example 8 | Comparative Example 9 | Comparative Example 10 |
|---|---|---|---|---|---|---|---|
| Epoxy resin composition | Tackiness and drapability | Viscosity at 40° C. (Pa · s) | 19 | 166 | Unmeasurable | 1000 | 3254 |
|  |  | Viscosity at 60° C. (Pa · s) | 2 | 12 | 646 | 50 | 23 |
|  |  | Evaluation | C | B | C | B | B |
| Cured epoxy resin product | Flame retardancy | Char generation ratio measured with TG-DTA (%) (under air flow at 600° C.) | 38 | 39 | 39 | 49 | 39 |
|  |  | Char generation ratio measured with TG-DTA (%) (under nitrogen flow at 900° C.) | 26 | 27 | 28 | 38 | 34 |
|  |  | Evaluation | A | A | A | S | A |
| Laminate of carbon-fiber-reinforced composite material | Flame retardancy | Peak heat release rate in heat release test (kW/m$^2$) | — | — | — | — | — |
|  |  | Evaluation | — | — | — | — | — |

The invention claimed is:

1. An epoxy resin composition comprising components [A] to [E] below, the epoxy resin composition comprising, per 100 parts by mass of a total amount of the component [A], 25 to 45 parts by mass of [A1] a liquid bisphenol type epoxy resin and 20 to 40 parts by mass of [A2] a phenol novolac-type epoxy resin, the epoxy resin composition having a content ratio ([E]/[D]) of the component [E] to the component [D] of at least 1, and component [A1] contains 10 to 15 parts by mass of bisphenol F type epoxy resin, and the epoxy resin composition contains 5 to 50 parts by mass of component [E]:
   [A] an epoxy resin;
   [B] an amine-type curing agent;
   [C] a cure accelerator;
   [D] red phosphorus; and
   [E] aluminum hydroxide.

2. The epoxy resin composition according to claim 1, wherein the content ratio [E]/[D] is less than 25.

3. The epoxy resin composition according to claim 1, further comprising a thermoplastic resin (component [F]).

4. The epoxy resin composition according to claim 3, wherein the component [F] is polyvinyl formal or polyethersulfone.

5. The epoxy resin composition according to claim 4, wherein
   the component [F] is polyvinyl formal, and
   a content of the component [F] is 0.5 to 10 parts by mass per 100 parts by mass of the total amount of the component [A].

6. The epoxy resin composition according to claim 4, wherein
   the component [F] is polyethersulfone, and
   a content of the component [F] is 5 to 30 parts by mass per 100 parts by mass of the total amount of the component [A].

7. The epoxy resin composition according to claim 1, wherein a content of the component [D] is 2 to 10 parts by mass per 100 parts by mass of the total amount of the component [A].

8. The epoxy resin composition according to claim 1, wherein the content of the component [E] is 15 parts by mass or more and less than 45 parts by mass.

9. The epoxy resin composition according to claim 1, having a viscosity at 40° C. of 1,500 to 30,000 Pa·s and a viscosity at 60° C. of 10 to 700 Pa·s.

10. The epoxy resin composition according to claim 1, having a viscosity at 60° C. of 65 to 85 Pa·s.

11. A cured resin product comprising the epoxy resin composition according to claim 1 being cured.

12. A prepreg obtained by impregnating a reinforcing fiber with the epoxy resin composition described in claim 1.

13. A fiber-reinforced composite material comprising the prepreg according to claim 12 that is cured.

14. The epoxy resin composition according to claim 1, wherein a particle size of component [E] is 0.8 to 2.0 µm.

15. The epoxy resin composition according to claim 1, wherein a content ratio of bisphenol F type epoxy resin to bisphenol A type epoxy resin contained in [A1] is 1 or less.

* * * * *